Oct. 25, 1966     H. U. DEELEY, JR     3,280,462
DENTAL UNIT
Filed Aug. 31, 1964     3 Sheets-Sheet 2
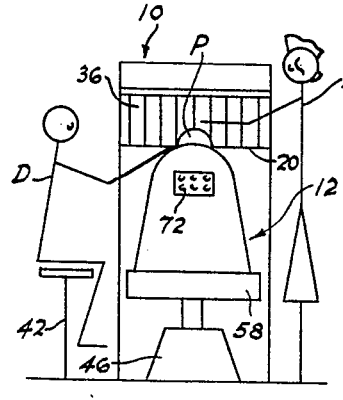
Fig. 5
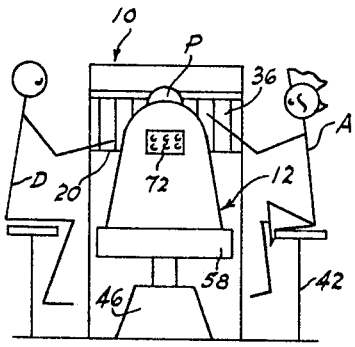
Fig. 6
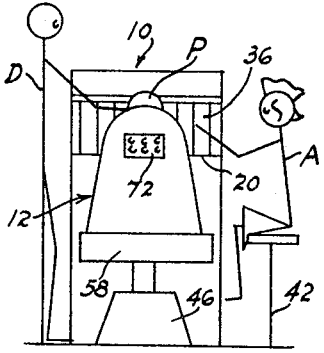
Fig. 7
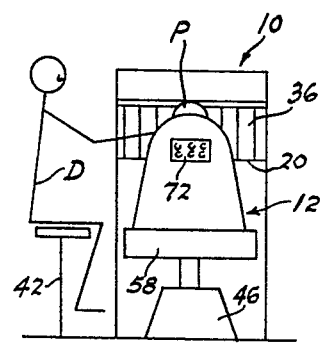
Fig. 9
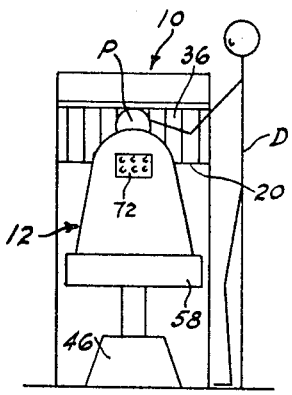
Fig. 10
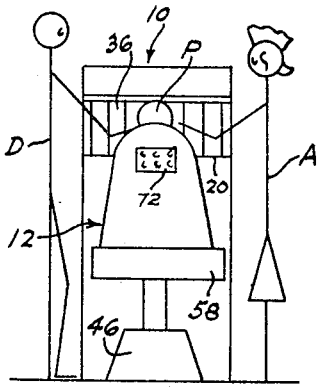
Fig. 8
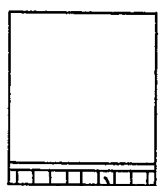
Fig. 11
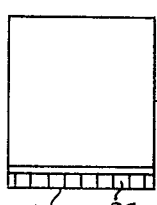
Fig. 12
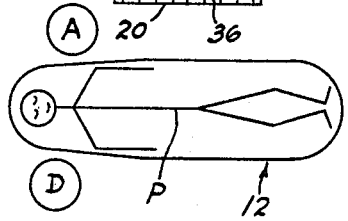
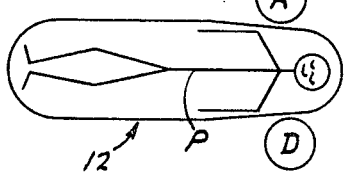
INVENTOR.
HASKIN U. DEELEY JR
BY
ATTORNEY Oct. 25, 1966  H. U. DEELEY, JR  3,280,462
DENTAL UNIT Filed Aug. 31, 1964  3 Sheets-Sheet 3

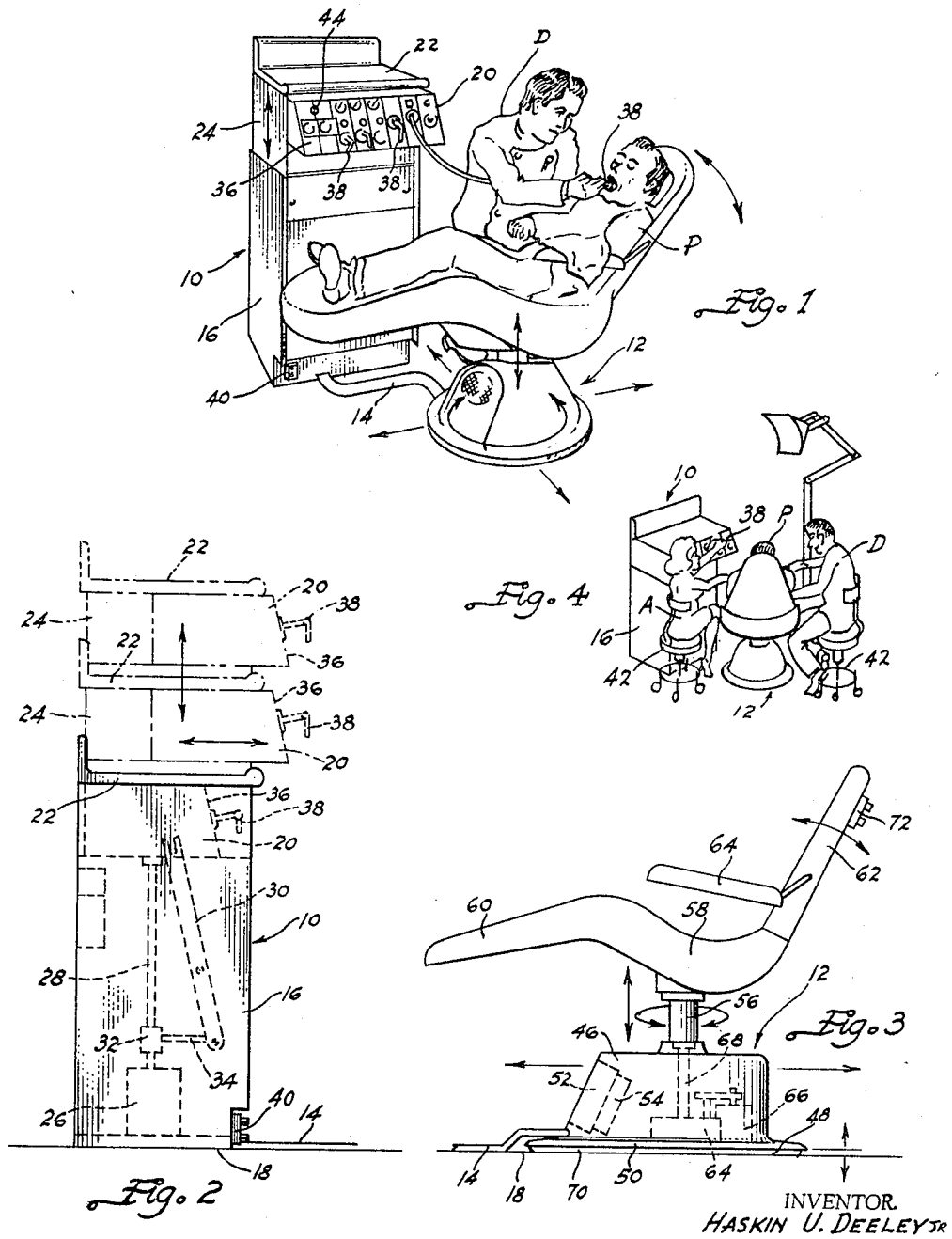

INVENTOR.
HASKIN U. DEELEY JR
BY
ATTORNEY

United States Patent Office 3,280,462
Patented Oct. 25, 1966

3,280,462
DENTAL UNIT
Haskin U. Deeley, Jr., Baltimore, Md., assignor to The Dentists' Supply Company of New York, York, Pa., a corporation of New York
Filed Aug. 31, 1964, Ser. No. 393,206
6 Claims. (Cl. 32—22)

This invention relates to a dental unit and, more particularly, to an arrangement of several novel pieces of dental equipment arranged for mutual cooperation to produce a new concept of dental operatory practice comprising the principles of the invention, details of which are explained hereinafter.

Since the dawn of dentistry, it has been customary for the head of the patient to be the focal point of all dental operatories. In this regard, the conventional dental chair comprises a seat and headrest which is only movable vertically with respect to the base of the chair and the base is stationarily positioned upon the floor of the operatory. Most modern dental chairs also permit the back to be tilted to adjustable positions relative to the seat of the chair. However, the seat and back of the chair are not even movable about a vertical axis. As a result, all personnel and instruments employed in any dental operation move and are moved to and from the head of the patient. In general, the head of the patient remains stationary during substantially all dental operations, with the exception of leaning forwardly to expectorate into the spittoon.

Because of the foregoing arrangement, it is necessary for a right-handed dentist, for example, to arrange the cabinetry and dental stand or unit in his operatory in the most convenient location with respect to his operation upon a patient. In contrast, a left-handed dentist normally will have his cabinetry and dental stand or unit arranged oppositely to that which is most suitable to a right-handed dentist. Further, under such circumstances, the dentist or dental assistant is required to reach for the dental instruments necessary for certain operations and to place certain movable equipment in the dental office, such as X-ray machines, in the most convenient location for the dentist with respect to the fixed head of the patient. Thus, the head of the patient is fixed relative to substantially all other items in the dental operatory and it therefore constitutes the focal point of the operatory and is the item relative to which everything and everybody else in the operatory moves.

The present arrangement of equipment in a dental operatory also includes a dental unit or stand which is fixed to the floor of the operatory, usually in slightly spaced relationship to the base of the dental chair, which, also, is fixed relative to the floor. Generally, the base of the chair and stand are positioned so close to each other that neither a dentist or a dental assistant can move between the two. Such fixed position of the dental unit or stand in the dental operatory also is inconvenient for the following reasons.

The fixed positioning of the dental stand more or less in the center of the floor space results in unnecessary waste of space which usually occurs in the far left corner of the operatory, as viewed from the doorway when entering from a hall, for example, and usually looking directly at the back of the chair toward the stand. Neither cabinetry nor equipment of any kind is placed in such corner in present arrangements. Such fixed dental unit also blocks access to wall storage facilities located to one side of and also to the back of the unit.

In addition to not permitting traffic between the chair and the unit, as mentioned above, the fixed relationship at present between the dental unit and base of the dental chair by no means allows maximum comfort and operating efficiency for the dentist, especially when working without the aid of an assistant; nor does it allow maximum comfort and operating efficiency for an assistant when she is handling the instruments to assist the dentist. In this regard, it is to be noted that most dentists work at least part-time without an assistant present during all the operations upon a patient and different relationships are desired for maximum comfort and efficiency of the dentist when an assistant is present, as compared with when an assistant is not present.

In addition to the objections to the fixing of a dental unit relative to the floor of the operatory, it is noted, in general, dental units present a certain psychological hazard to a patient and, at least some of the older type units, are unattractive and therefore non-esthetic. Accordingly, especially in accordance with the principles of the present invention, the dental unit ideally should be placed against a suitable wall surface where all available space in the central part of the operatory, as well as all wall space, can be used efficiently and effectively, without waste, thereby adding substantially no interference to traffic around the chair, nor blocking access to any of the cabinetry or instruments. Further, the design of the dental unit lends itself under such circumstances to being more esthetically pleasing and harmonious with the other cabinetry and instrumentation in the modern type of dental operatory.

Even if the dental unit is not fixed to the central portion of the operatory floor, however, but the dental chair is still fixed to the floor, many of the inefficiencies, discomforts, and other unsatisfactory situations referred to above, would remain in the operatory. Accordingly, to achieve maximum comfort and efficiency for the dentist and assistant, regardless of whether working simultaneously or not, as well as affording possibilities to provide maximum esthetic appearances in the operatory, the ideal arrangement, in accordance with the present invention, is to provide a chair which is movable to any desired location in the operatory, at will, in addition to the other desirable features flowing from the removal of the conventional dental stand from a fixed position in the central portion of the operatory floor.

It is the principal object of the present invention to provide dental equipment primarily comprising a novel type of dental chair and an equally novel type of dental stand which are movable respectively in certain ways relative to each other and also with respect to a fixed supporting surface, for example, so as to permit movement of the patient to the dental equipment, rather than vice versa, as has been customary for quite a few years, whereby compact, efficient, and economical arrangement of dental equipment substantially of all types now is possible within the spirit of the present invention.

Another object of the invention is to utilize the movability of a patient relative to at least the principal items of dental equipment in a dental operatory so that the head of the patient may readily and quickly be adapted to the greatest convenience and efficiency to the dentist and/or the dental assistant, regardless of whether the dentist or his assistant is left-handed, right-handed, seated, standing, or because of numerous other variations in working conditions which contribute to the effectiveness and efficiency of all movements and operations performed by the dentist and/or his assistant.

Essentially, the foregoing objectives are achieved by utilizing a dental chair having a base which readily is movable horizontally over the floor surface of the operatory in accordance with fundamental principles comprising the subject matter of pending patent application Serial No. 275,594, filed April 25, 1963. These objectives also require the employment of a dental stand or unit having a head which supports a substantial number of dental instruments of various kinds and is capable of quickly being moved vertically, as well as horizontally, forward and backward so as to position the instruments at the position of greatest convenience to the dentist or his assistant in accordance with the principles comprising the subject matter of pending application Serial No. 331,788, filed December 19, 1963, and regardless of whether one or both of the dentist or assistant are standing or seated, or one or both are left-handed or right-handed, or tall or short.

By being able to move the head of the patient while the patient is seated in the type of chair referred to, the patient may be moved vertically or horizontally so as to produce substantially universal movement of the patient's head and thereby position it exactly where the dentist or his assistant desires it for greatest convenience to the dentist and/or his assistant, in suiting their relationship to each other, to perform any particular type of dental operation required in the dental operatory.

In describing the equipment illustrated in the drawings, it is to be understood that the same primarily is exemplary and is included essentially for purposes of illustrating the basic principles embodied in the present invention and the dental unit or system comprising the same. In view of this, only a minimum amount of details are illustrated specifically in the various figures, but sufficient to support the basic theories embodied in the present invention and comprising the subject matter of the appended claims. If greater details of any of the particular devices or mechanism are desired, attention is directed to co-pending applications Serial No. 275,594, directed to a Supporting Base for Chair, and Serial No. 331,788, directed to a Dental Stand. The inventions respectively described and claimed in said co-pending applications are sufficient unto themselves for their respective functions, whereas the present invention is directed to a combination of such devices and mechanisms resulting in a novel dental unit in which said devices and mechanisms cooperate with each other to provide a unit capable of realizing the full aims and advantages of the present invention.

In the drawings, in which certain of the aforementioned, exemplary dental mechanisms and devices are illustrated for purposes of providing a visual basis for appreciating the principles of the invention:

FIG. 1 is an exemplary perspective view of a dental unit embodying the principles of the present invention with reference to a dental stand associated with a mobile type dental chair in which an exemplary patient is illustrated in association with a dentist operating upon the patient without an assistant, various directions of movements of said illustrated dental mechanisms being indicated by appropriate arrows.

FIG. 2 is a side elevation of the dental stand of FIG. 1 illustrated on a larger scale than in said figure and, in dotted lines, showing several adjusted positions of the upper or instrument portion of the dental stand.

FIG. 3 is a side elevation of the exemplary dental chair of FIG. 1.

FIG. 4 is an exemplary perspective view of the dental chair shown in FIGS. 1 and 3 in association with a pair of movable dental stools respectively for the dentist and a dental assistant and shown in exemplary relationship with respect to the dental chair.

FIGS. 5–10 illustrate diagrammatically, in vertical elevation, various exemplary positions of the dental stand and chair of FIGS. 1–4 in relation to typical positions of a dentist and dental assistant with respect to an imaginary patient in the dental chair.

FIGS. 11–16 illustrate diagrammatically, and in plan view, various exemplary positions of a dental chair, with an imaginary patient therein, relative to the dental stand and also various exemplary positions of a dentist and dental assistant, when an assistant is present, relative to the patient and said equipment.

Figure 13:
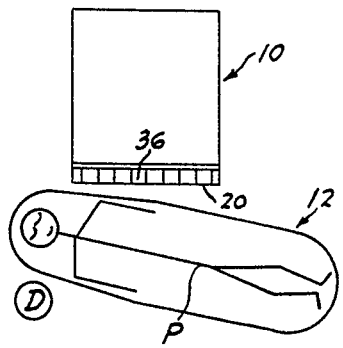
Figure 14:
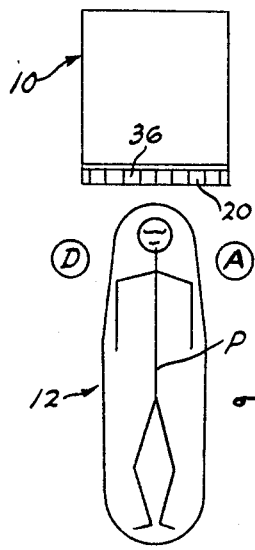

In accordance with the principles of the present invention, the dental unit comprising the same primarily consists of a dental stand 10 and a dental chair 12. As will be described in detail hereinafter, the dental stand 10 has certain advantageous characteristics which contribute materially to facilitating the comfort and efficiency of a dentist and his assistant, as well as contributing to the comfort of the patient, particularly when used in conjunction with certain other beneficial characteristics of the chair 12. As indicated above, one type of dental stand 10 highly suitable for use in the dental unit comprising the present invention is described and illustrated in detail in co-pending application Serial No. 331,788, filed December 19, 1963. Similarly, a chair of the type which is highly beneficial for use in the dental unit comprising the present invention is illustrated and described in co-pending application Serial No. 275,594, filed April 25, 1963.

It will be understood that the dental unit 10 requires at least certain minimum basic utilities, such as electric current, waste line, and water at available local pressures. In addition, unless the unit is provided with a self-contained air compressor, said unit also will require a supply of compressed air at required pressures. Though not illustrated in detail herein, in order to minimize the complexity of the illustration of the present description, the water and compressed air preferably are delivered to suitable plenum chambers contained in the unit and described in detail in said co-pending application Serial No. 331,788. The various hoses and conduits are not illustrated, but are in accordance with the illustrations, for example, shown in said co-pending application, to which attention is directed.

The electric current required by the dental stand 10 is intended to be delivered by a suitable electric power outlet in the dental operatory and is connected by suitable wiring, not shown, extending from said current outlet to the dental stand 10. In accordance with the present invention and as described in co-pending application Serial No. 275,594, the dental chair 12 requires at least electric power to operate the same and such power is furnished preferably through a flexible conduit 14, which extends from the base of the unit 10 to the base of the chair 12, as shown in exemplary manner in FIGS. 1 and 2, said conduit preferably lying loosely on the floor of the operatory. Various types of ribbon-like commercial electric conductors are available for such purpose.

The dental stand 10 primarily comprises a cabinet 16 which, in the preferred operation thereof, has a base portion that is stationarily supported by the floor or wall of the operatory, especially in view of the necessity to connect certain instruments carried thereby to the utilities normally present in a dental office, such as supplies of electric current, wasteline, water at available local pressure, and air under pressure. Gas for certain burners, sometimes required by dentists, also usually is made available. For purposes of simplifying the illustration in FIG. 2 particularly, however, no illustration of such supply lines is made. Should it be preferred to render the cabinet 16 portable, however, it would then only be necessary to connect the conduits or certain manifolds or headers, not shown, but carried within the cabinet, to such supply lines therefor by flexible conduits in order to furnish such utilities to the various instruments contained within the cabinet.

In accordance with the principles of the invention, there is provided within the upper portion of the cabinet 16 a head or carriage 20, which, preferably, has a top comprising a substantially horizontal work counter or supporting surface 22. In retracted or non-elevated position of the head 20, wherein the instruments are out of view of the patient and maintained clean, the work surface 22 actually may comprise a movable section of the counter arrangement provided in modern dental operatories on adjacent cabinetry.

Within the cabinet 16, as is explained in greater detail in co-pending application Serial No. 331,788, a sub-frame 24 is provided, which is movable vertically relative to the main, exterior portion of cabinet 16, such vertical movement being achieved by appropriate power means such as a motor 26 within the base of the cabinet 16 and, through suitable mechanism driven by the motor 26, such as exemplary screw jack means 28, the sub-frame 24 is raised and lowered with respect to the base portion of cabinet 16, such movement correspondingly raising and lowering the head 20.

The sub-frame 24, at its upper end, also suitably supports the head 20 for horizontally guided movement so as to project the head, for example, between the retracted position it occupies within the cabinet when in the lowermost position thereof illustrated in FIG. 2, to the projected position illustrated in the two uppermost exemplary view of he head 20 shown in FIG. 2, wherein the sub-frame is elevated. Such projecting movement is accomplished by any appropriate mechanism, such as the exemplary linkage shown in the form of a pivoted lever 30, which is carried by the sub-frame 24, and through appropriate gear means 32, or the like, and a drive member 34, the upper end of the lever 30 is moved forward and backward respectively to position the head 20 in retracted or projected position illustrated in FIG. 2. For more detailed explanation of other types of appropriate elevating and projecting mechanism for the head 20, attention is directed to the aforementioned co-pending application Serial No. 331,788.

Head 20 has a front face 36, which supports a substantial number of different types of dental instruments 38. In FIG. 1, the dentist D is illustrated in process of using one of the instruments 38 in the oral cavity of the patient P. The preferred manner of operating the dental stand 16, especially for purposes of arranging the head 20 and instruments 38 carried thereby in operative position, is to initiate elevating action of the sub-frame 24 and head 20 by actuating an appropriate switch 40, carried by the base of the cabinet 16, for example. As can be seen from said figure, said switch could be foot-actuated for convenience of the dentist or dental assistant.

Upon closing the switch 40 initially, the mechanism described hereinabove for actuating the sub-frame 24 and head 20 first elevates the head 20 so as to dispose it above the upper edge of the main portion of the cabinet 16, whereupon the actuating mechanism then moves the head 20 horizontally forward to the projected position shown in the two upper exemplary positions in FIG. 2. The lowermost of these projected positions, which is actually the intermediate position illustrated in FIG. 2, may be regarded as the lowest, normal operative position of the instruments 38. This is the position in which, for example, either a relatively short or average height dentist or dental assistant might find it convenient to grasp the dental instruments while seated upon one or the other of the stools 42 shown in FIG. 4, which are illustrated in exemplary positions for use by both a dentist and a dental assistant with respect to the chair 12.

The control arrangement for the cabinet 16 also is so-arranged that, for example, after the head 20 has been positioned in its initial, lowest operative position, if it is found that the vertical position of the dental instruments 38 is too low for the convenience either of the dentist or dental assistant, depending upon who is handling the instruments with respect to removing them from the head 20, additional elevation of the head 20, together with sub-frame 24, may be effected by suitable auxiliary mechanism such as switch means 44, preferably carried conveniently by the front face 36 of head 20, or otherwise.

Upon closing switch 44, the motor 26 will again be energized for purposes of additionally elevating the projected head 20 to whatever vertical position is found most comfortable for the dentist or dental assistant under any particular circumstances of operation upon a patient. Hence, it thus will be seen that the dental cabinet 16 and the mode of operating the same, as described hereinabove, primarily will result in all of the major and most commonly used dental instruments, which are contemplated to be carried by the head 20 of the dental cabinet, will not only be projected from the cabinet for ready access by a dentist or dental assistant, but they also quickly and readily are elevated to a desired height best suited for maximum comfort and efficiency to a dentist or dental assistant for use upon a patient.

Still further in accordance with the present invention, the chair 12 is of the mobile type. One specific chair of this type is shown in aforementioned co-pending application Serial No. 275,594, filed April 25, 1963, and for such details of a chair of this type which are not illustrated and described hereinafter, attention is directed to said co-pending application. The principal purpose for having the chair 12 mobile is to contribute, in a substantial manner, to the primary objective principle of the present invention, namely, to be able to move the patient to substantially any desired location in the dental operatory, quickly and with minimum effort. To accomplish this, it may be necessary to move the base of the chair transversely relative to the floor, rotate the same about the vertical axis of the chair, or a combination of both types of movements. As a result, the convenience and comfort, as well as efficiency of the dentist and dental assistant, are factors of prime consideration in connection with the present invention. Notwithstanding this, however, maximum comfort is afforded the patient, but the spirit of the present invention envisions the dental operatory as being instrument and equipment-oriented, rather than patient-oriented.

The base 46 of the chair 12 is readily mobile, the preferred means for motivation comprising the generation of an air film or cushion beneath the bottom surface 48 of the chair. To effect this, a preferably annular plenum chamber 50 extends radially inward a desired distance from the periphery of the base and receives air at a desired pressure from the blower or fan 52, which is operated by electric motor 54 that is energized by current delivered to the chair through the flexible conduit 14, which preferably extends along the floor 18 and is readily movable over the floor surface incident to the base 46 of the chair being moved as desired by the dentist or dental assistant.

The base 46, through a suitable pedestal 56, supports the chair seat 58 which, in the specific illustration in FIGS. 1, 3 and 4, is of the modern type embodying an extension 60 by which the legs of the patient are comfortably supported in extended manner, and a back 62 which, preferably, is supported by the seat 58 for limited angular movement, as indicated by the double-headed arrow adjacent the back. Such movement of the back relative to the seat 58 is accomplished by mechanism within the interior of the seat, such mechanism not being illustrated in detail since it does not actually constitute an essential part of the present invention. Chair arms 64, of a modern type, extend laterally forward from opposite sides of the back 62 and are capable of pivotal movement upwardly to permit the patient readily to gain access to or exit from the chair seat 58.

Not only is lineal or rotary horizontal movement afforded by the chair 12, but, to further render the head of the patient positionable at any desired location within the dental operatory for efficient and comfortable operation by the dentist and dental assistant, the chair seat 58 also is vertically movable relative to the base 46. Such vertical movement is accomplished conveniently by exemplary mechanism including a gear reduction unit 64 operated by another electric motor 66, which obtains current from the flexible electrical conduit 14 extending from the base of the dental stand 10. Any appropriate mechanism capable of readily elevating the chair seat 58 relative to base 46 can be driven by the gear-reduction unit 64, such as a ball screw 68, or the like, to raise and lower the pedestal 56 with respect to base 46.

Horizontal movement of the base 46 relative to the floor surface 18 preferably is accomplished by the aforementioned air film being generated through the means of a preferably overall perforated-type diaphragm 70, which is flexible. Certain types of fabrics, including woven fabrics, which preferably provide uniformly spaced pores or openings of relatively small size, are highly suitable for this purpose. Air, under pressure, delivered to the plenum chamber 50 is uniformly distributed preferably over the entire inner surface of the diaphragm 70 to discharge therethrough and escape between the diaphragm and the floor surface 18. Surprisingly low air pressure is capable of providing a suitbale film of air for the foregoing purpose.

While not absolutely restricted thereto, it is preferred in the construction of the dental chair 12 that the chair seat 58 be non-rotatable relative to the base 46, primarily to permit ready steering of the chair base 46 by the dentist when he desires to move the same and such steering is effected by the dentist engaging the back 62 or the sides of the seat 58, for example. Through such maneuvering to steer the base 46 over the floor surface 18, the dentist readily may move the chair not only in various linear directions, as indicated by certain of the arrows adjacent the base 46 in FIG. 3, but he also may rotate the chair about its vertical axis, as indicated by the curved double-headed arrow in said figure.

Vertical movement in opposite directions of the seat 58 relative to base 46 is possible by raising and lowering the pedestal 56 in the manner indicated above and as further illustrated diagrammatically by the double-headed vertical arrow in FIG. 3. Linear and rotatable movement of the entire dental chair 12 is provided while a film or cushion of air is being discharged between the diaphragm 70 and the floor surface 18, whereby all such movement of the chair base 46 relative to the floor is accomplished with the application of a minimum of force by the dentist or dental assistant upon the chair.

Control of the motive force by which the air pressure is generated, as well as the elevating and lowering means for the chair seat, is accomplished preferably by conveniently located means which, due to the fact that the motive power for the air-generating means and elevating and lowering means are electric motors, comprise an electric switch assembly 72 mounted, for example, suitably on the rear surface of the chair back 62 or back of headrest and comprising a plurality of individual switches. Thus, if the dentist desires to move the chair either linearly relative to the floor, or rotatably about its vertical axis, it is only necessary to close one switch of the switch assembly 72. The motor 54 then instantly starts, generating sufficient air pressure, by means of the blower or fan 52, to cause the perforated diaphragm 70 to become inflated and cause air to be discharged uniformly from the lower surface thereof against the floor surface and thereby form a discharging film of air upon which the base of the chair glides relative to the floor.

Such support of the chair provides frictionless and practically effortless movement of the chair over the floor, even when a patient of substantial weight occupies the seat 58. At the completion of any such movement, compound or otherwise, it is only necessary for the dentist to open the aforementioned control switch for the motor 54, whereby it immediately stops, the air pressure generated by the blower or fan 52 instantly decreases to zero, and the chair base then immediately settles to a slightly lower position than when the diaphragm 70 is inflated to effect movement of the base over the floor, whereupon the chair rests firmly by gravity upon the floor, being directly disposed upon the deflated diaphragm 70.

Raising and lowering of the chair seat 58 is initiated by another one of the switches of the switch assembly 72 for purposes of energizing motor 66 to cause the elevating means 68 to be operated and thereby raise and lower the seat between its maximum uppermost and lowermost positions permitted by the elevating means 68 and the control means therefor. If desired, for purposes of controlling the angular position of the back 62 relative to the chair seat 58, still another switch of the switch assembly 72 may be connected thereto to effect such movement, whereby it will be seen that all of the controls for the movable portions of the chair 12, as well as to readily effect all movements of the chair relative to the floor surface, easily and quickly are effected by the dentist through one or the other of the several switches of the switch assembly 72.

To afford some visual concepts of a number of the various possible relative vertical positions of especially the head or carriage 20 of the dental stand, the chair 10, the dentist D, and the dental assistant A, particularly when the dentist and assistant are both sitting or both standing, or one or the other of them is standing and the other is sitting, attention is directed to FIGS. 5–10. The vertical adjustability of the patient by means of the vertical actuating means 68 for the chair, together with the vertical elevating means 28 of the stand permit the vertical positioning of the head of the patient and carriage 20 at whatever positions are found most efficient and convenient to the dentist or the dental assistant, regardless of the relative heights of the dentist and dental assistant.

To illustrate, assume that the dentist D is seated, as shown in FIG. 5, and the dental assistant A is standing. Under such circumstances, the dental assistant normally reaches for the instruments supported by the front face 36 of the head 20 of the dental stand. Thus, the head 20 is adjusted to the best height to suit the dental assistant while standing whereas the head of the patient P has been disposed vertically to effect the best efficiency and convenience of the dentist D by adjusting the height of the chair seat 58 to accomplish this through operation of one of the switches of switch assembly 72. Thus, particularly when the dentist is aided by an assistant, the height of the carriage 20 of the dental unit is adjusted to best suit the convenience and comfort of the assistant, while the height of the head of the patient is adjusted by the dentist to best suit has comfort and convenience, taking into consideration, in all instances, whether or not the dentist or the assistant is seated or standing, and considering also the height of the dentist and dental assistant in either of such positions of operation.

To further illustrate the foregoing general principles, it will be seen from FIG. 6, wherein the dentist as seated, that the height of the patient's head is substantially the same as in FIG. 5, but, in this figure, the dental assistant is seated, whereby the height of the carriage 20 of the dental stand has been lowered to best suit the convenience fo the seated assistant.

In contrast to the foregoing, FIG. 7 illustrates the condition when the dentist D is standing, whereby the height of the chair seat 58 and head of the patient P have been elevated above the positions shown in FIGS. 5 and 6 wherein the dentist is seated, but the height of the head 20 of the dental stand remains the same in FIG. 7 as shown in FIG. 6 because the assistant is still seated. Referring, however, to FIG. 8, wherein both the dentist and the assistant are standing, it will be seen that the head 20 of the dental stand has been elevated to a vertical position best suited to the assistant A while standing, as in FIG. 5, for example.

Under most circumstances, either for brief periods or otherwise, a dentist will sometimes operate without and sometimes with an assistant and two exemplary positions respectively are shown in FIGS. 9 and 10, FIG. 9 being shown to illustrate the height of the head 20 of the dental stand 10 which has been regulated vertically to best suit the dentist D while seated, whereas in FIG. 10, the head 20 of the dental stand has been elevated so as to be more convenient to the dentist D while standing. This also contributes substantially to the need for horizontal positioning of the chair.

In accordance with the principles of the invention, and further to illustrate the ready movability of the patient's head in a horizontal manner relative to the dental equipment, attention is directed to FIGS. 11-16, particularly to contrast the present invention to existing known situations wherein dental stands are immovably connected to the floor of the operatory at a fixed location and dental chairs similarly are fixed to the floor at a predetermined location, such chairs offering only vertical adjustability of the patient and angular movement of the back of the chair relative to the seat, whereby whether the dentist naturally is left-handed or right-handed, he must adjust his position as best he can to the relatively fixed positions of the patient's head and the dental stand which supports the instruments. The position that is right for the dentist when the assistant is absent usually is not best suited for the assistant when present.

In accordance with the present invention, with reference to FIG. 11, the patient P has been arranged relative to the dental stand 10 so as to be most convenient for a right-handed dentist D, or a left-handed dentist choosing to operate by direct vision, not only to operate upon the patient but also to permit the assistant A to be disposed near the front face 36 of the carriage 20 of the dental stand 10 so as readily to remove instruments therefrom which are required by the dentist, vertical positioning already having been appropriately adjusted, as well as quickly to replace the same into their receptacles in such carriage. Under such circumstances, the dentist is in a very comfortable position to extend his right hand to receive the instruments from the assistant A.

The arrangement shown in FIG. 12 is similar to that shown in FIG. 11, except that, in the arrangement in FIG. 12, it is assumed that the dentist is either left-handed or is right-handed but chooses to operate directly, and thus the head of the patient has been arranged relative to the dental stand 10 in an opposite manner to that shown in FIG. 11 so as to permit the dentist readily to slightly reach across the patient and receive dental instruments from the assistant A, who, as in the arrangement shown in FIG. 11, is conveniently located adjacent the front face 36 of the carriage 20 of the dental stand 10.

In comparing the arrangements respectively shown in FIG. 11 and 12, it will be seen, for example, that if the chair 12 merely were mounted for rotation about a fixed vertical pivot, it would not be possible to revolve the chair and patient about such vertical pivot without interfering with the dental stand, especially if it is desired to place the patient reasonably close to the dental stand for convenience of both the dentist and dental assistant. Accordingly, compound rotary and linear movement, which is afforded by the particular type of portability afforded the dental chair 12, as described hereinabove, will permit the chair and patient therein to be moved as close as desired to the dental stand 10, for example, or to any other location within the dental operatory, such as to and from the X-ray machine, the filling preparation cabinet, the impression materials cabinet, and various other cabinets and areas in the operatory to which it would be most convenient to move the patient rather than, as now, requiring either the dentist or the dental assistant, or both, and regardless of whether right or left-handed, to move between the patient and such cabinets, usually consuming a number of steps, and added time, in doing so.

Figure 15:
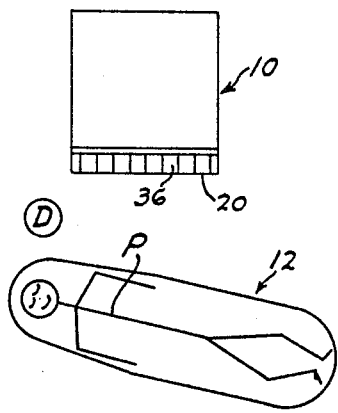
Figure 16:
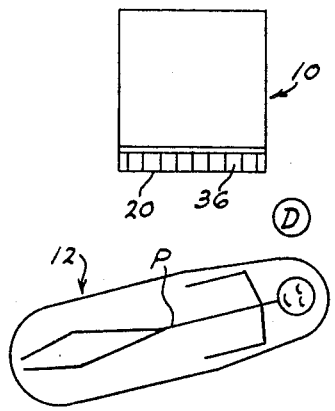

The arrangement in FIG. 15 allows dentist D to operate without assistant A by simply moving the patient closer to the stand. FIG. 16 allows dentist D to operate without assistant A by placing the patient between the instruments and head; thus the dentist need not reach across the patient.

From the foregoing, it will be seen that the present invention introduces a new concept in the operation of a dental operatory by changing the center of the sphere of operation from the patient, concerning which everything was brought to him, regardless of how much additional effort or walking energy and consumption of time was required, to a much more efficient and comfort-producing concept of moving the patient to the required sphere within the operatory where it is desired to operate thereupon with certain instruments, cabinet equipment, or otherwise. Of equal significance to the concept of providing for such adaptation of the patient to the equipment is the further concept of the most commonly used metal instruments contained in a head or carriage of a dental cabinet or stand being adjustable vertically to best suit the comfort, convenience and efficiency of a dentist, if working alone, or both a dentist and a dental assistant, if a dental assistant is being used.

Consideration likewise is given to whether or not either or both of the dental assistant and dentist are seated or standing. Still further, the heights of the dentist and dental assistant are taken into consideration so as to further contribute to the efficiency, comfort and ease of operation of both the dentist and dental assistant. Such improvement in efficiency, comfort and convenience to the dentist and dental assistant has not been at the expense of comfort to the patient in that the positioning of the head of the patient takes place through no effort on the part of the patient and entirely while the patient is seated in a very comfortable chair, usually in a somewhat reclined position.

The comfort to the patient actually is improved or increased due to the much more conveniently positioned instruments and items of dental equipment which contribute to his comfort and are capable of much more readily being used by dentist and dental assistant than in previously used equipment. Such instruments and equipment include portable cuspidors, vacuum equipment for removing debris from the oral cavity incident to drilling and cutting operations, saliva ejector, cautery, pulp tester, oral examination light, and a variety of dental handpieces or drills designed preferably for certain specific operations within the oral cavity to which they are best suited. The selection of such handpieces by the dentist may be made quickly simply by replacing one previously selected handpiece in the receptacle therefor in the carriage of the dental stand and selecting a handpiece better suited for a further operation, for example.

The arrangement of all these various instruments in the head or carriage of the dental stand of the present invention also is much more attractive and far less fear-inspiring than the rather grotesque appearance of most existing types of dental instrument stands at present wherein the patient not infrequently has the concept of being subjected to a "den of mechanical horrors" as soon as he enters a dental operatory filled with many unrelated and awkward appearing devices which induce in the patient a sense of somewhat being "hemmed in by foes."

While the invention has been described and illustrated in its several preferred embodiments, it should be understood that the invention is not to be limited to the precise details herein illustrated and described since the same may be carried out in other ways falling within the scope of the invention as claimed.

I claim:

1. An instrument-oriented dental unit comprising in combination, a dental stand having vertically movable support means, carriage means carried by the upper part of said support means, means on said carriage to receive and support a selection of dental instruments, power means connectable to a source of power and carried by said dental stand and selectively operable to move said support means and carriage vertically in opposite directions to position said carriage at a desired vertical height affording maximum efficiency and comfort to a dentist and assistant when selecting an instrument for use, a dental chair, means supporting said dental chair for horizontal and vertical movements to permit a dentist to move the head of a patient when seated in the chair to any desired vertical and horizontal position selected for maximum comfort and efficiency of the dentist and assistant relative to dental instruments carried by said carriage means of said dental stand, power means carried by said chair and operable to move said chair to selected positions as aforesaid relative to said dental stand, and power conducting means extending from the base of said dental stand to the base of said dental chair to deliver power from said dental stand to the power means for moving said dental chair.

2. The dental unit set forth in claim 1 further characterized by said dental stand having base means arranged to be supported stationarily against vertical movement relative to a floor or the like of a dental operatory, and said vertically movable carriage being supported for vertical movement relative to the upper portion of said base means.

3. The dental unit set forth in claim 2 further including control means for said power means within said dental stand carried by the base portion of said dental stand for ready access by the toe of a dentist or assistant.

4. The dental unit set forth in claim 1 further characterized by said dental chair having a back connected to a seat thereon and including control means for said power operated means within said chair base carried by said chair back at a convenient location for said dentist to operate.

5. The dental unit set forth in claim 1 further characterized by said base for said dental chair having means to discharge air under pressure therefrom against a supporting floor surface adequate to provide a film of air upon which said chair base is supported for gliding relative to said floor surface and thereby permit ready movement of said chair horizontally and about a vertical axis to a desired adjusted position with minimum effort, said chair base being maintained in an adjusted position by gravity and frictional contact with a supporting floor surface when said discharge of air is disconnected.

6. The dental unit set forth in claim 5 in which said means to discharge air under pressure therefrom comprises blower means connected to and operated by said power means within said base of said dental chair.

References Cited by the Examiner
UNITED STATES PATENTS

| | | | |
|---|---|---|---|
| 973,573 | 10/1910 | Sims | 312—209 X |
| 2,172,063 | 9/1939 | Hara | 297—345 X |
| 2,424,729 | 7/1947 | Andreasen | 32—22 |
| 2,490,694 | 12/1949 | Leutheuser | 312—223 |
| 2,743,787 | 5/1956 | Seck | 183—37 |
| 3,111,759 | 11/1963 | Shackelford | 32—22 |

FOREIGN PATENTS 909,003   10/1962   Great Britain.

RICHARD A. GAUDET, *Primary Examiner.*

ROBERT E. MORGAN, *Examiner.*